United States Patent
Moon et al.

(10) Patent No.: US 12,043,240 B2
(45) Date of Patent: Jul. 23, 2024

(54) ERRONEOUS VELOCITY DATA DETECTION ALGORITHM SYSTEMS AND METHODS

(71) Applicant: GOODRICH CORPORATION, Charlotte, NC (US)

(72) Inventors: Suk-Min Moon, Greenwood, IN (US); Marc Georgin, Dayton, OH (US); Emad Al-Tabakha, Dayton, OH (US); Kaman Thapa Magar, Beavercreek, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 332 days.

(21) Appl. No.: 17/549,498

(22) Filed: Dec. 13, 2021

(65) Prior Publication Data

US 2023/0182703 A1    Jun. 15, 2023

(51) Int. Cl.
*B60T 8/17* (2006.01)
*B60T 8/58* (2006.01)
(Continued)

(52) U.S. Cl.
CPC .............. *B60T 8/96* (2013.01); *B60T 8/885* (2013.01); *B60T 17/22* (2013.01); *B64C 25/42* (2013.01);
(Continued)

(58) Field of Classification Search
CPC . B60T 8/96; B60T 8/885; B60T 17/22; B60T 8/325; B60T 2250/04;
(Continued)

(56) References Cited

U.S. PATENT DOCUMENTS 3,964,796 A * 6/1976 Bremer ................. B60T 8/1708
                                                                303/178
5,353,022 A   10/1994 Middleton et al.
(Continued)

FOREIGN PATENT DOCUMENTS

DE    10238787 A1 *  3/2003  .............. B60T 8/885
EP    2238007       11/2011
WO    2021122517    6/2021

OTHER PUBLICATIONS

Rezaeian et al., "Simultaneous Vehicle Real-Time Longitudinal and Lateral Velocity Estimation," Mar. 2017 (Year: 2017).*
European Patent Office, European Search Report dated Sep. 8, 2023 in Application No. 22211060.3.

*Primary Examiner* — Jonathan L Sample
*Assistant Examiner* — Byron Xavier Kasper
(74) *Attorney, Agent, or Firm* — SNELL & WILMER L.L.P.

(57) ABSTRACT

A method for detecting an erroneous velocity data using a controller in communication with a velocity sensor onboard a vehicle includes receiving a time-series velocity data from the velocity sensor, calculating a time-series acceleration data using the time-series velocity data, calculating a time-series jerk data using the time-series acceleration data, calculating a saturated (numerically bounded) jerk data using the time-series jerk data, calculating an estimated acceleration data using the saturated jerk data, calculating a difference between the estimated acceleration data and the time-series acceleration data, and determining whether the difference is greater than a threshold value. The erroneous velocity data is detected in response to the difference being greater than the threshold value.

15 Claims, 7 Drawing Sheets

(51) Int. Cl.
*B60T 8/72* (2006.01)
*B60T 8/88* (2006.01)
*B60T 8/96* (2006.01)
*B60T 17/22* (2006.01)
*B64C 25/42* (2006.01)
*G07C 5/04* (2006.01)
*B60T 8/32* (2006.01)

(52) U.S. Cl.
CPC .............. *G07C 5/04* (2013.01); *B60T 8/325* (2013.01); *B60T 2250/04* (2013.01); *B60T 2270/406* (2013.01)

(58) Field of Classification Search
CPC .... B60T 2270/406; B60T 8/1703; B60T 8/58; B60T 8/72; B60T 8/171; B60T 2230/04; B60T 8/32; B60T 8/3205; B60T 8/321; B60T 8/34; B60T 8/52; B60T 8/54; B60T 8/56; B60T 8/86; B60T 8/74; B64C 25/42; B64C 25/46; G07C 5/04; B60W 10/184; B60W 10/18; B60W 30/18109; B60W 40/10
See application file for complete search history.

(56) References Cited

U.S. PATENT DOCUMENTS

| | | | |
|---|---|---|---|
| 9,550,478 B2* | 1/2017 | Kim | B60T 7/122 |
| 10,202,125 B2 | 2/2019 | Kasaiezadeh Mahabadi et al. | |
| 10,247,303 B2 | 4/2019 | Nassouri | |
| 11,015,535 B2 | 5/2021 | Ajami et al. | |
| 2001/0039472 A1* | 11/2001 | Isogai | B60K 31/0008 701/96 |
| 2009/0299554 A1 | 12/2009 | Freissinet | |
| 2013/0103280 A1* | 4/2013 | Roll | B60T 8/172 701/74 |
| 2013/0345913 A1* | 12/2013 | Krueger | B60T 13/662 701/22 |
| 2015/0298676 A1* | 10/2015 | Matsumura | B60T 17/22 701/34.4 |
| 2017/0210368 A1* | 7/2017 | Svensson | B60T 8/4072 |
| 2017/0259795 A1* | 9/2017 | Das | B60W 30/17 |
| 2017/0355473 A1* | 12/2017 | Cahill | B64C 25/34 |
| 2019/0106101 A1* | 4/2019 | Takaki | B60T 8/172 |
| 2019/0377339 A1* | 12/2019 | Nath | B60W 10/18 |

* cited by examiner

ERRONEOUS VELOCITY DATA DETECTION ALGORITHM SYSTEMS AND METHODS

FIELD

The present disclosure relates generally to the field of aircraft brake control systems, and more specifically to systems and methods for monitoring the speed of an aircraft.

BACKGROUND

Many systems on modern aircraft, particularly those that provide control over aircraft position and/or trajectory, utilize speed data. During flight, speed data that may be utilized include, for example, an indicated airspeed (IAS), a calibrated airspeed (CAS), an equivalent airspeed (EAS), and a true airspeed (TAS). However, during ground maneuvers, it is common to use a speed value which accurately indicates the speed of the aircraft relative to the ground, referred to hereinafter as groundspeed.

Modern aircraft typically have multiple systems for determining groundspeed. One way of providing particularly accurate groundspeed measurements may be provided by global positioning system (GPS) data. However, in some circumstances, the GPS signals may be temporarily lost or transmitted erroneously and become unreliable. In such circumstances, aircraft speed values received by the brake system may accordingly become unreliable.

SUMMARY

A system for controlling a braking force applied to a wheel of a vehicle is disclosed, in accordance with various embodiments. The system comprises a brake control unit having an input for receiving a measured vehicle velocity data and a velocity sensor operatively coupled to the vehicle for measuring a speed of the vehicle and providing an output signal indicative of the measured vehicle velocity data. The brake control unit is configured to detect an error in the measured vehicle velocity data by receiving, at the brake control unit, the measured vehicle velocity data from the velocity sensor, calculating, by the brake control unit, an acceleration data using the measured vehicle velocity data, calculating, by the brake control unit, a jerk data using the acceleration data, calculating, by the brake control unit, a saturated jerk data using the jerk data, calculating, by the brake control unit, an estimated acceleration data using the saturated jerk data, calculating, by the brake control unit, a difference between the estimated acceleration data and the acceleration data, and determining, by the brake control unit, whether the difference is greater than a threshold value, wherein the error is detected in response to the difference being greater than the threshold value.

In various embodiments, the brake control unit is further configured to utilize a last known correct velocity data and a filter length for a predetermined duration in response to detecting the error.

In various embodiments, the brake control unit is further configured to generate an error hold flag for the predetermined duration, wherein the error hold flag indicates that the calculated acceleration data is erroneous.

In various embodiments, the brake control unit is further configured to reset an integrator in response to the error hold flag being lowered, wherein the integrator is used to perform the calculating the estimated acceleration data.

In various embodiments, the brake control unit is further configured to filter the measured vehicle velocity data, wherein the calculating the acceleration data is performed using the filtered velocity data.

In various embodiments, the brake control unit is further configured to filter the acceleration data, wherein the calculating the jerk data is performed using the filtered acceleration data.

In various embodiments, the filtering step is performed using a low pass filter.

In various embodiments, the system further comprises a brake coupled to the wheel of the vehicle, wherein the calculated acceleration data is used by the brake control unit to command the braking force to the wheel with the brake.

A brake control unit for controlling braking operation of a wheel of a vehicle based on an output signal provided by a velocity sensor coupled to the vehicle is disclosed, in accordance with various embodiments. The brake control unit comprises a first derivative logic configured to calculate a time-series acceleration data using a time-series velocity data received from the velocity sensor, a second derivative logic configured to calculate a time-series jerk data using the time-series acceleration data, a saturate logic configured to calculate a time-series saturated jerk data using the time-series jerk data, an integrator configured to calculate an estimated acceleration data using the time-series saturated jerk data, an absolute difference calculator configured to calculate a difference between the estimated acceleration data and the time-series acceleration data, and an error threshold logic configured to determine whether the difference is greater than a threshold value. The brake control unit is configured to utilize the time-series acceleration data to command a braking force in response to the difference being less than the threshold value. The brake control unit is configured to utilize a last-known correct acceleration data to command the braking force in response to the difference being greater than the threshold value.

In various embodiments, the brake control unit further comprises a first filter configured to filter the time-series velocity data, wherein the first derivative logic is configured to calculate the time-series acceleration data using the filtered time-series velocity data.

In various embodiments, the brake control unit further comprises a second filter configured to filter the time-series acceleration data, wherein the second derivative logic is configured to calculate the time-series jerk data using the filtered time-series acceleration data.

In various embodiments, the brake control unit further comprises an error hold counter reset logic configured to output an error hold counter flag for a predetermined duration after it is determined that the difference is greater than the threshold value.

In various embodiments, the brake control unit further comprises a falling edge logic configured to detect the error hold counter flag being lowered and further configured to reset the integrator in response thereto.

In various embodiments, the brake control unit further comprises an initial condition logic configured to provide the integrator with an initial condition based upon whether the error still persists when an integrator reset command is received. The last value of estimated acceleration may be used as an initial condition if an error is present. The calculated aircraft acceleration may be used as an initial condition if the error is no longer present.

In various embodiments, the brake control unit utilizes at least one of the last-known correct acceleration data and the time-series acceleration data to calculate a brake force.

A method for detecting an erroneous velocity data using a controller in communication with a velocity sensor onboard a vehicle is disclosed, in accordance with various embodiments. The method comprises receiving, by the controller, a time-series velocity data from the velocity sensor, calculating, by the controller, a time-series acceleration data using the time-series velocity data, calculating, by the controller, a time-series jerk data using the time-series acceleration data, calculating, by the controller, a saturated jerk data using the time-series jerk data, calculating, by the controller, an estimated acceleration data using the saturated jerk data, calculating, by the controller, a difference between the estimated acceleration data and the time-series acceleration data, determining, by the controller, whether the difference is greater than a threshold value, and detecting, by the controller, an error in the time-series velocity data in response to the difference being greater than the threshold value.

In various embodiments, the method further comprises filtering the time-series velocity data, wherein the calculating the time-series acceleration data is performed using the filtered time-series velocity data.

In various embodiments, the method further comprises filtering the time-series acceleration data, wherein the calculating the time-series jerk data is performed using the filtered time-series acceleration data.

In various embodiments, the method further comprises commanding, by the controller, a braking force using a last known correct velocity data in response to detecting the error.

In various embodiments, the method further comprises commanding, by the controller, the braking force using the calculated time-series acceleration data in response to the difference being less than the threshold value.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings illustrate various embodiments employing the principles described herein and are a part of this specification. The illustrated embodiments are meant for description only, and they do not limit the scope of the claims, and in which:

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein described without departing from the scope and spirit of the disclosure. Thus, the detailed description herein is presented for purposes of illustration only and not of limitation.

During braking of an aircraft, the velocity changes continuously until stop, however the change in acceleration is relatively small. When an erroneous velocity data is present, there may be a large, sudden change in velocity data received by the controller compared to an immediately previous operating condition. This tends to cause the large change in acceleration. The rate of change of the acceleration (jerk) tends to be even larger in these events. Systems and methods disclosed herein may detect the erroneous velocity by inspecting the deviation in jerk from its nominal value.

Figure 2A:
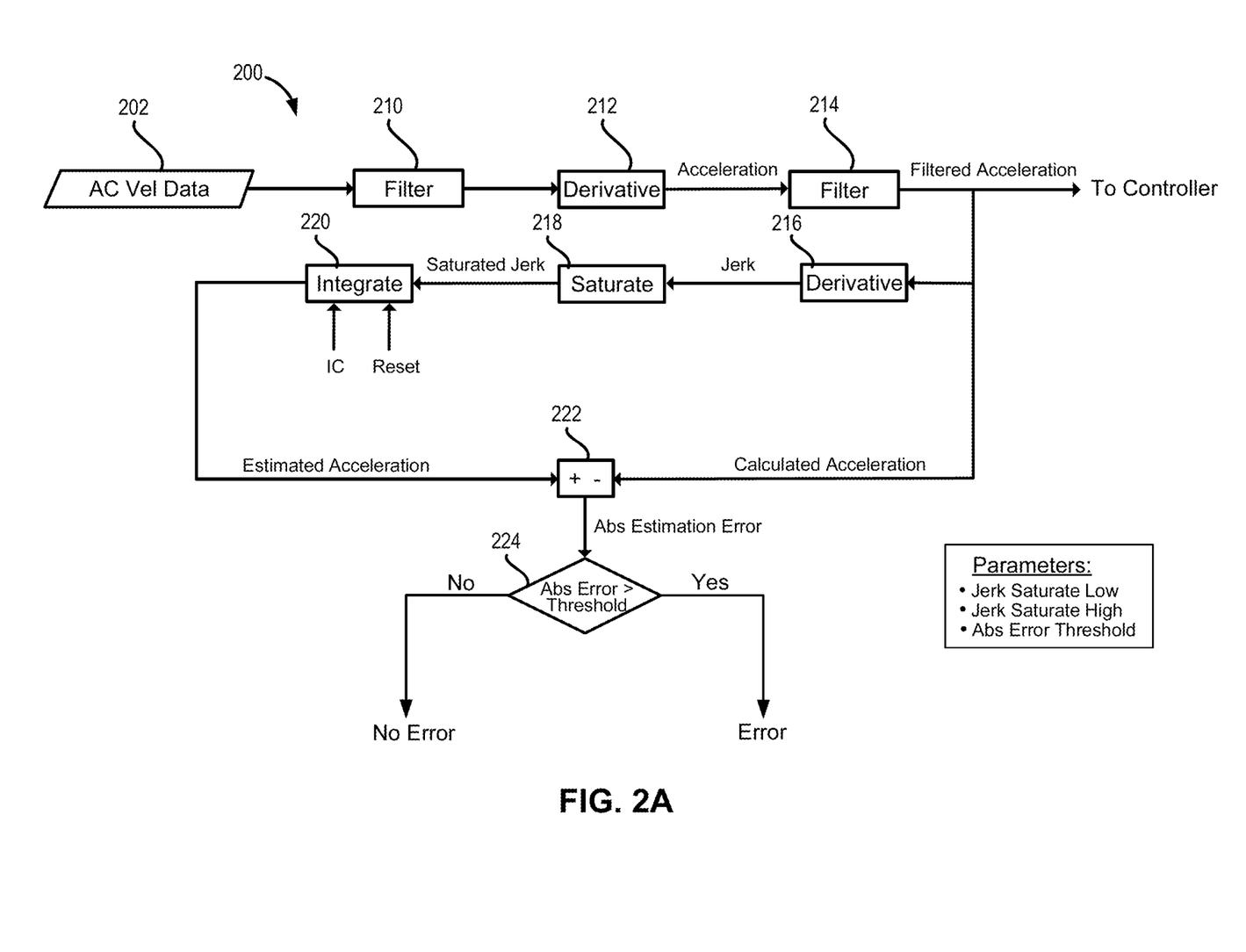
FIG. 2A is a block diagram of a system for detecting erroneous velocity data, in accordance with various embodiments.
Figure 2B:
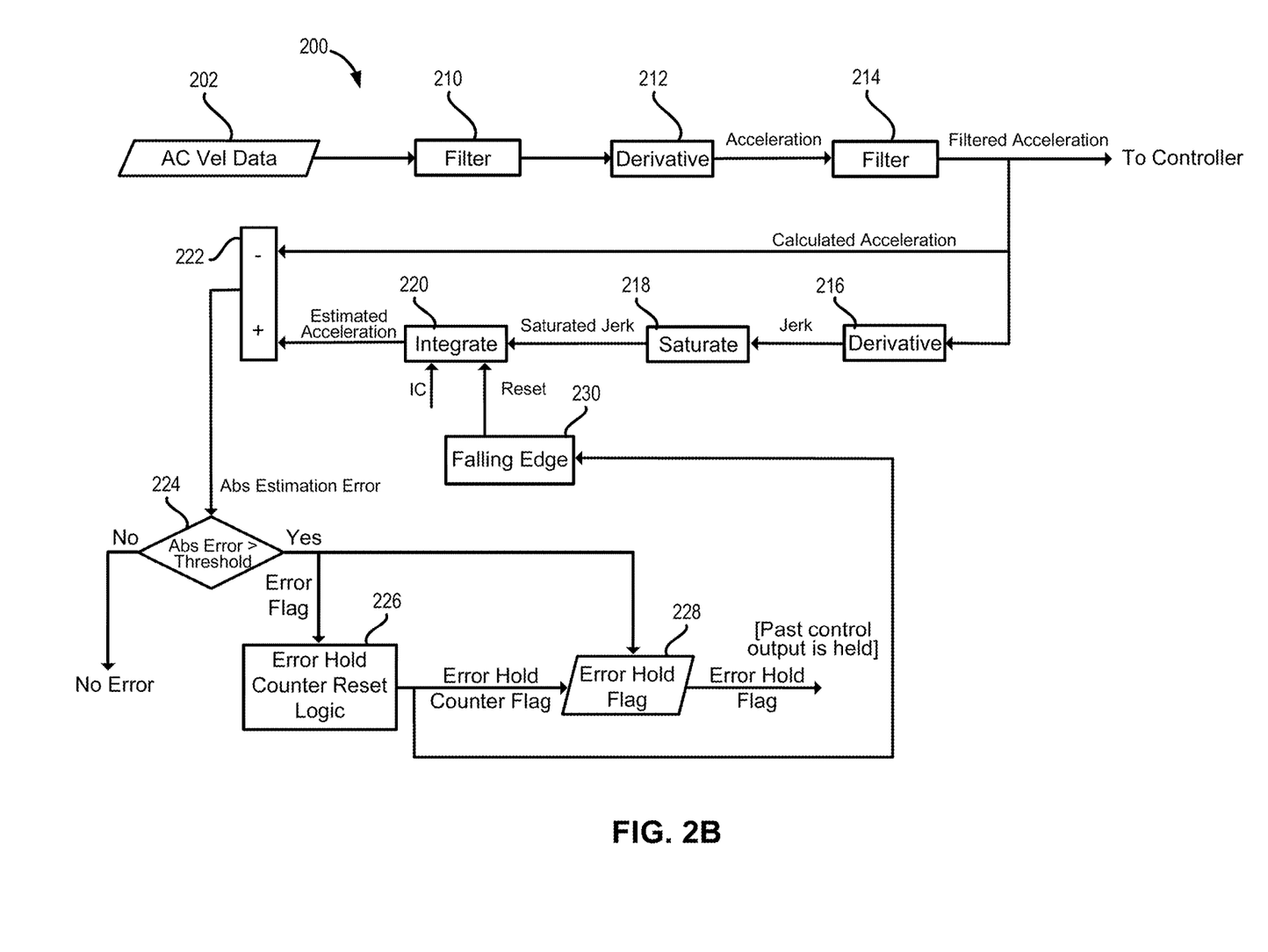
FIG. 2B is a block diagram of the system for detecting erroneous velocity data of FIG. 2A including integrator reset control logic, in accordance with various embodiments.
Figure 2C:
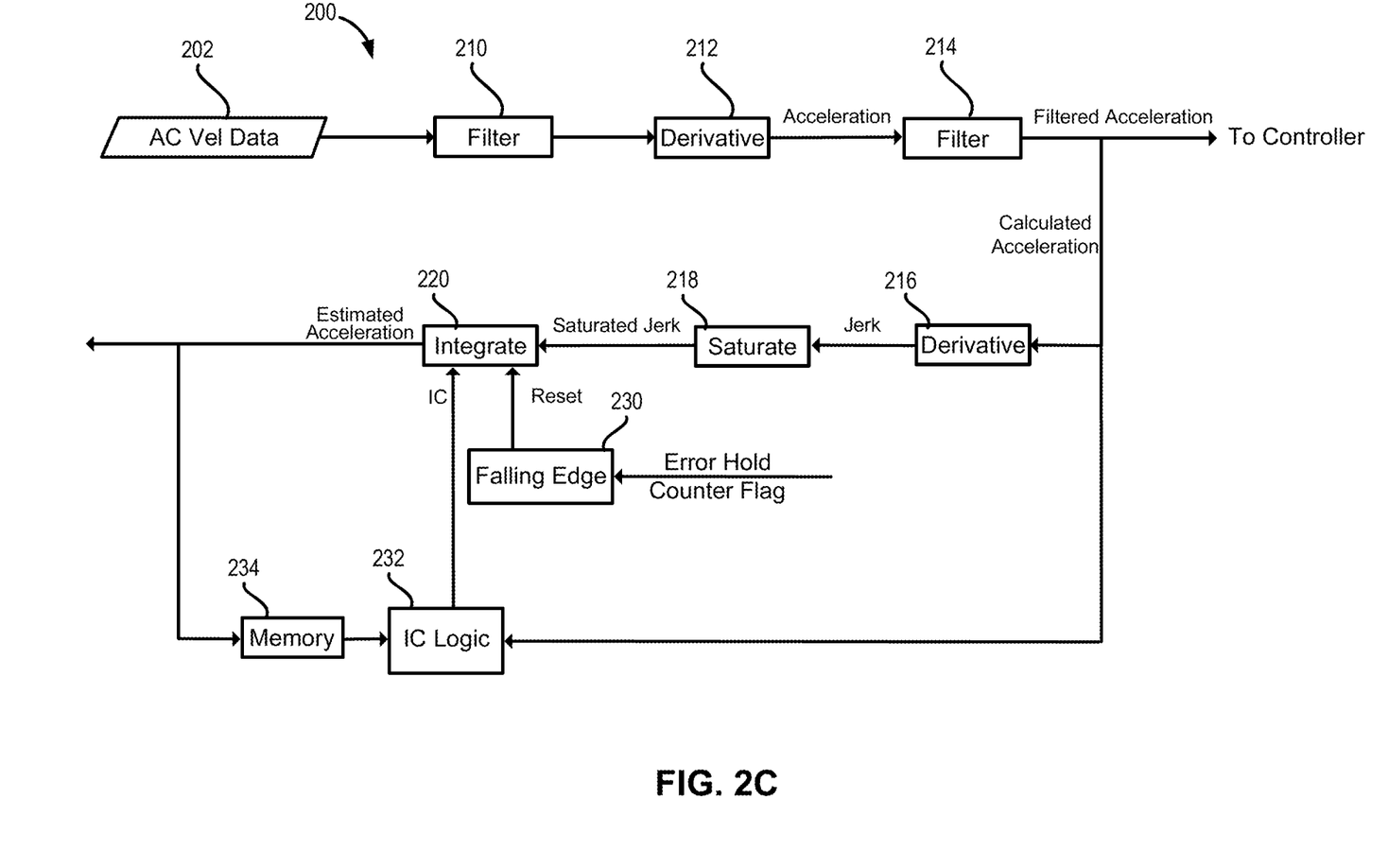
FIG. 2C is a block diagram of the system for detecting erroneous velocity data of FIG. 2B including integrator initial condition logic, in accordance with various embodiments.

Systems and methods disclosed herein may be useful for detection of erroneous velocity data. A system for detecting erroneous velocity data is schematically illustrated in the block diagram of FIG. 2A through FIG. 2C provided herein. The velocity error detection algorithm of the present disclosure may be implemented by an existing controller onboard a vehicle, such as a brake control unit for example. The velocity error detection algorithm may be configured to detect erroneous velocity data by using one or more filtering, deriving, saturating, integrating, and comparing processes. The velocity error detection algorithm of the present disclosure may be particularly useful during a taxi maneuver of an aircraft, or during low speeds (e.g., less than about 10 knots of a vehicle) when wheel speed sensors tend to become unreliable. In this regard, a brake control unit may switch from brake control based upon wheel speed sensor data to brake control based upon GPS aircraft speed data at low speeds using the velocity error detection algorithm of the present disclosure. In response to an erroneous velocity data being detected, the velocity error detection algorithm of the present disclosure may ignore the erroneous data and continue using a last known accurate velocity data for a predetermined duration and/or until the velocity data is no longer erroneous.

The velocity error detection algorithm of the present disclosure may operate under the following assumptions:

a. Aircraft mass is large, resulting in large inertia.

b. Sudden change of aircraft velocity and acceleration is relatively small due to large inertia of the aircraft.

c. The variation in the velocity and therefore the variation in the acceleration under normal operating condition can be quantified based on the error bound of the aircraft speed sensor.

d. A sudden large change in aircraft velocity and acceleration is not possible due to the aircraft's inertia, therefore the corresponding jerk calculation from the measured velocity can be numerically bounded within a certain range based on the speed sensor's error bound.

Based on the above assumptions, the velocity error detection algorithm of the present disclosure may employ one or more of the following steps, in various embodiments, described in further detail herein, to detect the error:

I. Acceleration is calculated from the measured velocity via numerical derivative.

II. Jerk is then calculated through numerical derivative of the acceleration.

III. The calculated jerk is numerically bounded (saturated) by pre-determined values to account for unrealistic values resulting from the erroneous velocity data.

IV. The numerically bounded jerk is numerically integrated to estimate the acceleration.

V. Acceleration estimation error is calculated by comparing the estimated acceleration with the calculated acceleration from the measured velocity data. The calculated acceleration contains the data with potentially erroneous velocity.

VI. Based on the assumption (c), the estimation error is used to detect the erroneous velocity data by comparing with a predefined error bound.

VII. Once the error is detected, the erroneous data flag is raised

Although the embodiments herein are described with reference to braking systems used in connection with aircraft, such embodiments are provided for example only as it is contemplated that the disclosures herein have applicability to other systems that use aircraft speed, as well as other vehicles, such as automobiles and/or vehicles with brakes.

Figure 1:
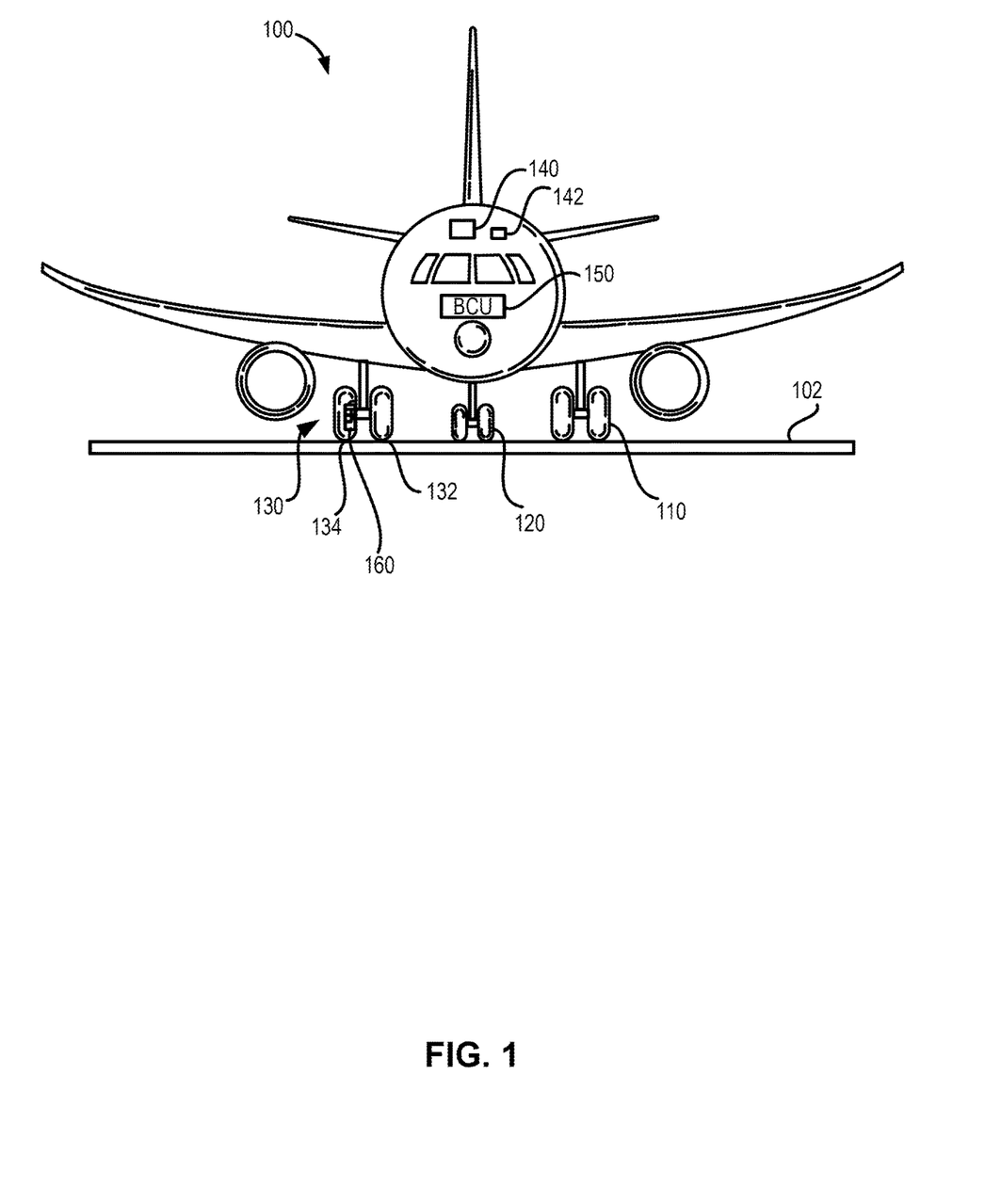
FIG. 1 illustrates an aircraft having multiple landing gear and brakes, in accordance with various embodiments.

With reference to FIG. 1, an aircraft 100 on runway 102 is illustrated, in accordance with various embodiments. Aircraft 100 includes multiple landing gear systems, including a landing gear 110, landing gear 120, and landing gear 130. Landing gear 110, landing gear 120, and landing gear 130 each include one or more wheel assemblies. For example, landing gear 130 includes an inner wheel assembly 132 and an outer wheel assembly 134. Landing gear 110, landing gear 120, and landing gear 130 support the aircraft 100 when the aircraft 100 is not flying, thereby allowing the aircraft 100 to take off, land, and taxi without damaging the aircraft 100. In various embodiments, landing gear 120 may be a nose landing gear of aircraft 100. The wheels of the nose landing gear may differ from the wheels of the other landing gear in that the nose wheels may not include a brake. In various embodiments, landing gear 110, landing gear 120, and landing gear 130 are operationally retractable into the aircraft 100 when the aircraft 100 is in flight and/or airborne.

In various embodiments, the aircraft 100 further includes an avionics unit 140, which includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, avionics unit 140 controls, at least various parts of, the flight of, and operation of various components of, the aircraft 100. For example, avionics unit 140 controls various parameters of flight, such as an air traffic management systems, auto-pilot systems, auto-thrust systems, crew alerting systems, electrical systems, electronic checklist systems, electronic flight bag systems, engine systems flight control systems, environmental systems, hydraulics systems, lighting systems, pneumatics systems, traffic avoidance systems, trim systems, and the like.

In various embodiments, aircraft 100 further includes a brake control unit (BCU) 150 which includes one or more controllers (e.g., processors) and one or more tangible, non-transitory memories capable of implementing digital or programmatic logic. In various embodiments, for example, the one or more controllers are one or more of a general purpose processor, DSP, ASIC, FPGA, or other programmable logic device, discrete gate, transistor logic, or discrete hardware components, or any various combinations thereof or the like, and the one or more memories store instructions that are implemented by the one or more controllers for performing various functions, such as monitoring an aircraft speed, as will be discussed herein. In various embodiments, the BCU 150 controls, at least various parts of, the braking of the aircraft 100. For example, the BCU 150 controls various parameters of braking, such as manual brake control, automatic brake control, antiskid braking, locked wheel protection, touchdown protection, park capability, gear retraction braking, and the like.

In various embodiments, aircraft 100 further includes one or more brakes coupled to each wheel assembly. For example, a brake 160 is coupled to the outer wheel assembly 134 of landing gear 130 of aircraft 100. In operation, brake 160 applies a braking force to outer wheel assembly 134 upon receiving a brake command, such as from BCU 150. In various embodiments, outer wheel assembly 134 of the landing gear 130 of aircraft 100 comprises any number of wheels.

In various embodiments, the aircraft 100 further includes a velocity sensor 142. In various embodiments, velocity sensor 142 may be a GPS. In various embodiments, velocity sensor 142 may send groundspeed measurements of aircraft 100 to avionics unit 140 and/or BCU 150.

With reference to FIG. 2A, a system 200 for detecting erroneous velocity data (i.e., also referred to herein as an erroneous velocity data detection algorithm) is schematically illustrated, in accordance with various embodiments. System 200 may comprise instructions stored in memory and configured to be implemented by one or more processors (e.g., BCU 150 with momentary reference to FIG. 1). In this regard, system 200 may be implemented by BCU 150, though it is contemplated herein that system 200 may be implemented using any suitable aircraft system. System 200 may receive aircraft velocity data 202. In various embodiments, aircraft velocity data 202 is received by BCU 150 (see FIG. 1) from avionics unit 140 (see FIG. 1). In various embodiments, aircraft velocity data 202 is received by avionics unit 140 (see FIG. 1) from velocity sensor 142 (see FIG. 1). In various embodiments, aircraft velocity data 202 is received by BCU 150 (see FIG. 1) from velocity sensor 142 (see FIG. 1). In various embodiments, aircraft velocity data 202 comprises aircraft speed data generated using a GPS. Aircraft velocity data 202 may be time-series data (i.e., a collection of velocities for an aircraft at different time intervals (generally equally spaced at a predetermined frequency).

In various embodiments, system 200 comprises a first filter 210. First filter 210 may be a low pass filter. First filter 210 may be configured to filter out undesired noise from aircraft velocity data 202. In this regard, aircraft velocity data 202 may be first passed through a low pass filter 210. In this manner, system 200 may generate a time-series data of filtered aircraft velocity.

In various embodiments, system 200 further comprises a first derivative logic 212. First derivative logic 212 may calculate the aircraft acceleration by calculating the derivative of the filtered aircraft velocity data 202. In this manner, system 200 may generate a time-series data of aircraft acceleration.

In various embodiments, system 200 further comprises a second filter 214. Second filter 214 may be a low pass filter. Second filter 214 may be configured to filter out undesired noise from the aircraft acceleration data. In this regard, the aircraft acceleration data may be passed through second filter 214. In this manner, system 200 may generate a time-series data of filtered aircraft acceleration (also referred to herein as calculated aircraft acceleration).

In various embodiments, system 200 further comprises a second derivative logic 216. Second derivative logic 216 may calculate the aircraft jerk (i.e., the rate of change of aircraft acceleration) by calculating the derivative of the filtered aircraft acceleration data. In this manner, system 200 may generate a time-series data of aircraft jerk.

In various embodiments, system 200 further comprises a saturate logic 218. Saturate logic 218 may calculate a saturated aircraft jerk by limiting the rate of change of acceleration to a predetermined maximum value (also referred to herein as Jerk Saturate High). In this manner, saturate logic 218 may limit the aircraft jerk from exceeding values which are believed to be physically impossible and/or improbable under typical operating conditions. For example, erroneous jerk data may indicate that a rate of change in aircraft deceleration is greater than the jerk saturate high value, and saturate logic 218 may limit this jerk data to the jerk saturate high value. Saturate logic 218 may further limit the rate of change of acceleration to a predetermined minimum value (also referred to herein as Jerk Saturate Low). In this manner, system 200 may generate a time-series data of saturated aircraft jerk.

In various embodiments, system 200 further comprises an integrator 220. Integrator 220 may calculate an estimated aircraft acceleration by calculating the integral of the saturated aircraft jerk data. In this manner, system 200 may generate a time-series data of estimated aircraft acceleration.

In various embodiments, system 200 further comprises an absolute difference calculator 222 configured to calculate an absolute difference between the estimated acceleration data (i.e., the output of integrator 220) and the calculated acceleration data (i.e., the output of filter 214). In various embodiments, system 200 further comprises an error threshold logic 224 configured to determine whether the absolute difference is greater than a predetermined threshold value (also referred to herein as Abs Error Threshold). In response to the difference being less than the threshold value, system 200 may be configured to utilize the calculated acceleration data. In response to the difference being greater than the threshold value, the system 200 recognizes that the data is erroneous and is configured to utilize a last-known correct acceleration data. For example, system 200 may be configured to utilize the previous calculated acceleration value. In various embodiments, where system 200 is performed by a brake control unit, the brake control unit may calculate a braking force using the acceleration data output of system 200.

With reference to FIG. 2B, further details of system 200 are schematically illustrated, in accordance with various embodiments. In particular, further details of the integrator 220 reset control are illustrated. System 200 may further comprise an error hold counter reset logic 226. Error hold counter reset logic 226 may be configured to output an error hold flag 228 for a predetermined duration (e.g., a predetermined duration by which the erroneous data is suspected to have subsided and/or passed) after the last detected erroneous acceleration data. For example, the output from error hold counter reset logic 226 may be 1 while the count is less than a predetermined value and 0 otherwise.

In various embodiments, the predetermined duration may be determined based on a filter length of first filter 210. When erroneous velocity values occur, the first filter 210 may cause erroneous velocity values to still be present in the controller even after the error is already cleared in the sensor and/or data transmission due to the fact that the first filter 210 includes previous samples (which may contain error) along with current sample (where error might have been already cleared). In this regard, the filter length may be used to calculate the predetermined time duration. As used herein, "filter length" refers to a number of velocity values used to calculate a running average. For example, if the filter length is 5, the current aircraft velocity value is averaged with the previous 4 values: (vel(n)+vel(n−1)+vel(n−2)+vel(n−3)+vel(n−4))/5. If the filter length is 3, the filtered aircraft velocity data may be calculated using (vel(n)+vel(n−1)+vel(n−2))/3. In this manner, aircraft velocity data 202 is filtered through first filter 210 to remove potential noise in the signal because taking the derivative (i.e., using derivate logic 212) tends to subsequently amplify any noise. In this regard, first filter 210 may be a running average filter.

System 200 may further comprise a falling edge logic 230. Falling edge logic 230 may detect when the error hold flag 228 falls from a 1 to a 0 (i.e., the falling edge) and may reset integrator 220 in response to the error hold flag 228 being lowered (i.e., changing from 1 to 0). In this manner, falling edge logic 230 may send an integrator reset command to integrator 220 to reset the integrator 220. In this manner, integrator 220 may be reset a predetermined duration after the last detected erroneous acceleration data.

With reference to FIG. 2C, further details of system 200 are schematically illustrated, in accordance with various embodiments. In particular, further details of the integrator 220 initial condition control are illustrated. System 200 may further comprise an initial condition logic 232 configured to adjust the initial condition used by the integrator at the end of an error hold counter flag. At that time, if an error still persists on the system 200, integrator 220 may start integrating from the previous estimated acceleration, which may be stored in memory 234. Otherwise, integrator may use the calculated acceleration as the initial condition for estimating the acceleration. In this manner, initial condition logic 232 may be configured to provide the integrator 220 with an initial condition based upon whether an erroneous velocity is detected.

Figure 3A:
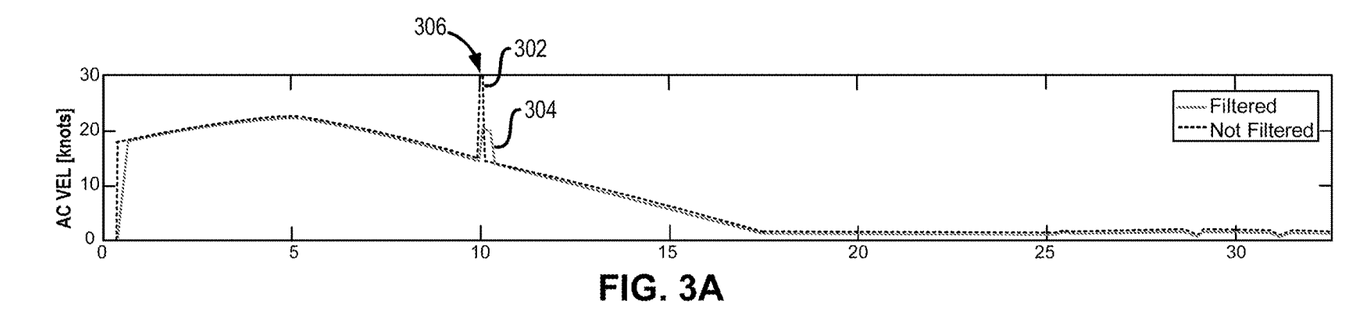
FIG. 3A is a chart of unfiltered aircraft velocity and filtered aircraft velocity versus time with a discrete velocity error, in accordance with various embodiments.

With reference to FIG. 3A, a chart of unfiltered aircraft velocity data 302 and filtered aircraft velocity 304 over time is illustrated, in accordance with various embodiments. As illustrated in FIG. 3A, filtering the aircraft velocity data (e.g., through a low pass filter) may tend to extend the duration of erroneous data. In FIG. 3A, erroneous data is introduced at point 306 (i.e., see at approximately 10 seconds).

Figures 3B, 3C:
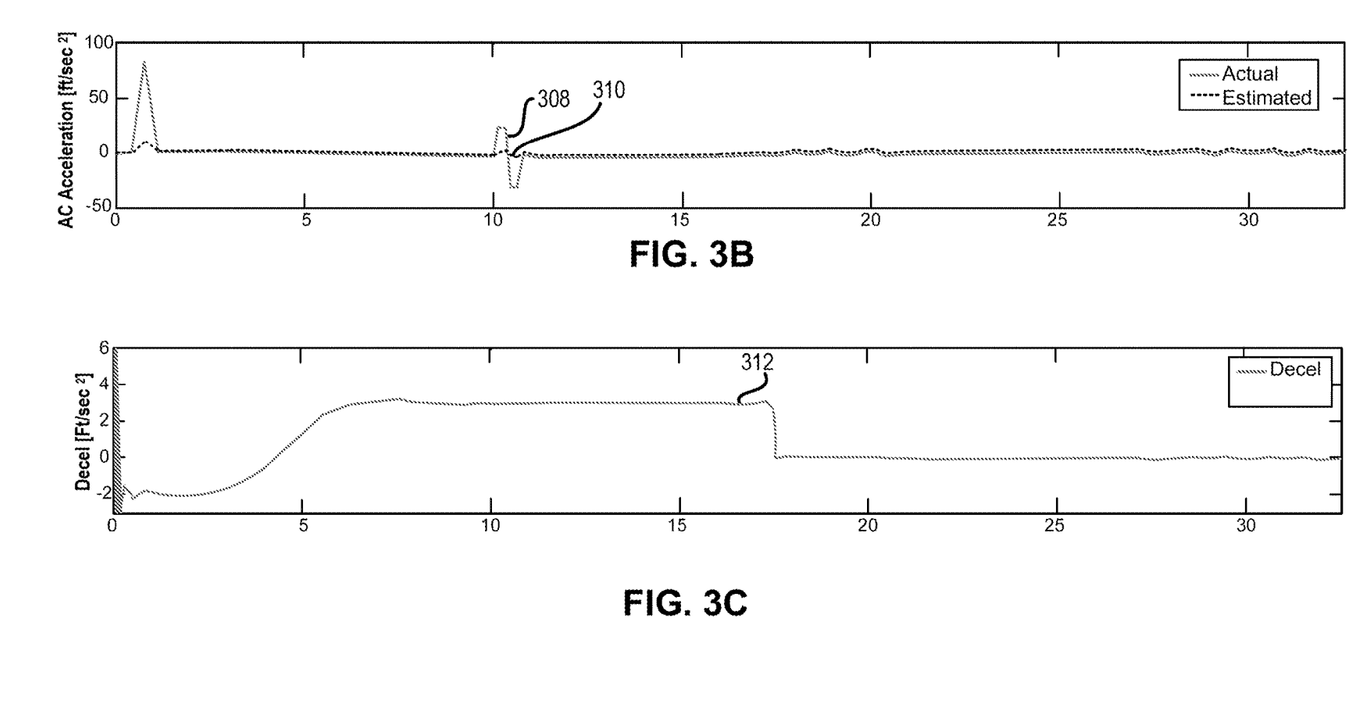
FIG. 3B is a chart of calculated aircraft acceleration and estimated aircraft acceleration versus time, in accordance with various embodiments.
FIG. 3C is a chart of calculated aircraft acceleration and estimated aircraft acceleration versus time, in accordance with various embodiments.

With reference to FIG. 3B, a chart of calculated aircraft acceleration 308 and estimated aircraft acceleration 310 over time is illustrated, in accordance with various embodiments. As illustrated in FIG. 3B, saturating the aircraft jerk before integrating to calculate estimated acceleration 310 may tend to reduce the magnitude of the estimated acceleration 310 compared to the calculated acceleration 308. In FIG. 3B, the calculated aircraft acceleration 308 and estimated acceleration 310 are calculated based on the filtered aircraft velocity 304 of FIG. 3A.

With reference to FIG. 3C, a chart of actual aircraft deceleration 312 over time is illustrated, in accordance with various embodiments. The controller command may be maintained constant while the error hold flag is raised (i.e., while error hold flag is raised to 1 from 0 with momentary reference to FIG. 2B). In FIG. 3C, the actual aircraft deceleration 312 is based on aircraft brake control using system 200 (see FIG. 2A through FIG. 2C) using aircraft velocity data 302 as the input. It should be recognized that system 200 maintains smooth and controlled braking despite errors in aircraft velocity data 302.

Figure 4A:
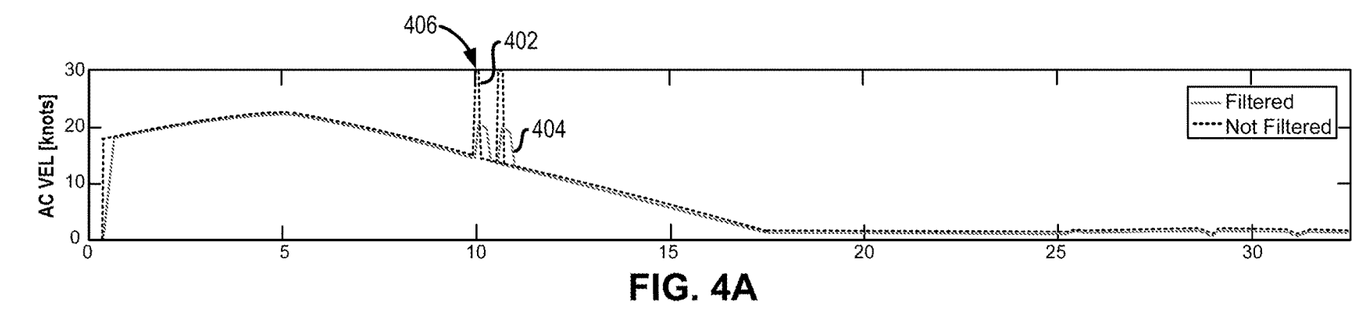
FIG. 4A is a chart of unfiltered aircraft velocity and filtered aircraft velocity versus time with two discrete velocity errors, in accordance with various embodiments.
Figure 4B:
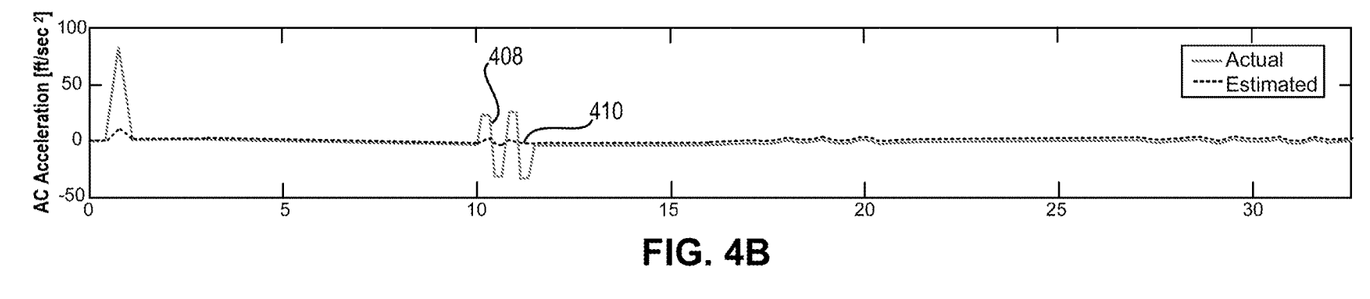
FIG. 4B is a chart of calculated aircraft acceleration and estimated aircraft acceleration versus time, in accordance with various embodiments.
Figure 4C:
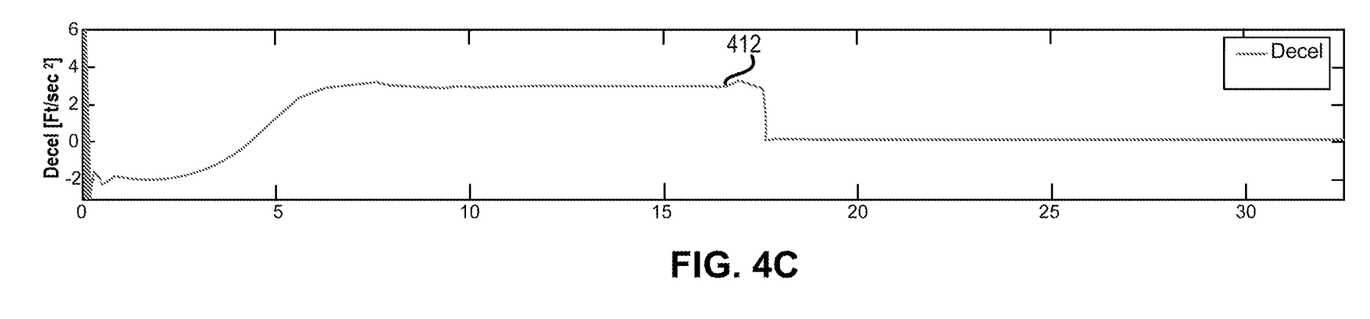
FIG. 4C is a chart of calculated aircraft acceleration and estimated aircraft acceleration versus time, in accordance with various embodiments.

With combined reference to FIG. 4A through FIG. 4C, charts similar to those of FIG. 3A through FIG. 3C are illustrated, except that two closely positioned erroneous data points (see at approximately 10 seconds and 11 seconds) are introduced into the aircraft velocity input data.

With reference to FIG. 4A, a chart of unfiltered aircraft velocity data 402 and filtered aircraft velocity 404 over time is illustrated, in accordance with various embodiments. As illustrated in FIG. 4A, filtering the aircraft velocity data (e.g., through a low pass filter) may tend to extend the duration of erroneous data. In FIG. 4A, two erroneous data points are introduced starting at point 406 (i.e., see at approximately 10 seconds and 11 seconds).

With reference to FIG. 4B, a chart of calculated aircraft acceleration 408 and estimated aircraft acceleration 410 over time is illustrated, in accordance with various embodiments. As illustrated in FIG. 4B, saturating the aircraft jerk before integrating to calculate estimated acceleration 410 may tend to reduce the magnitude of the estimated acceleration 410 compared to the calculated acceleration 408. In FIG. 4B, the calculated aircraft acceleration 408 and estimated acceleration 410 are calculated based on the filtered aircraft velocity 404 of FIG. 4A.

With reference to FIG. 4C, a chart of actual aircraft deceleration 412 over time is illustrated, in accordance with various embodiments. In FIG. 4C, the actual aircraft deceleration 412 is based on aircraft brake control using system 200 (see FIG. 2A through FIG. 2C) using aircraft velocity data 402 as the input. It should be recognized that system 200 maintains smooth and controlled braking despite multiple errors in aircraft velocity data 402.

Figure 5:
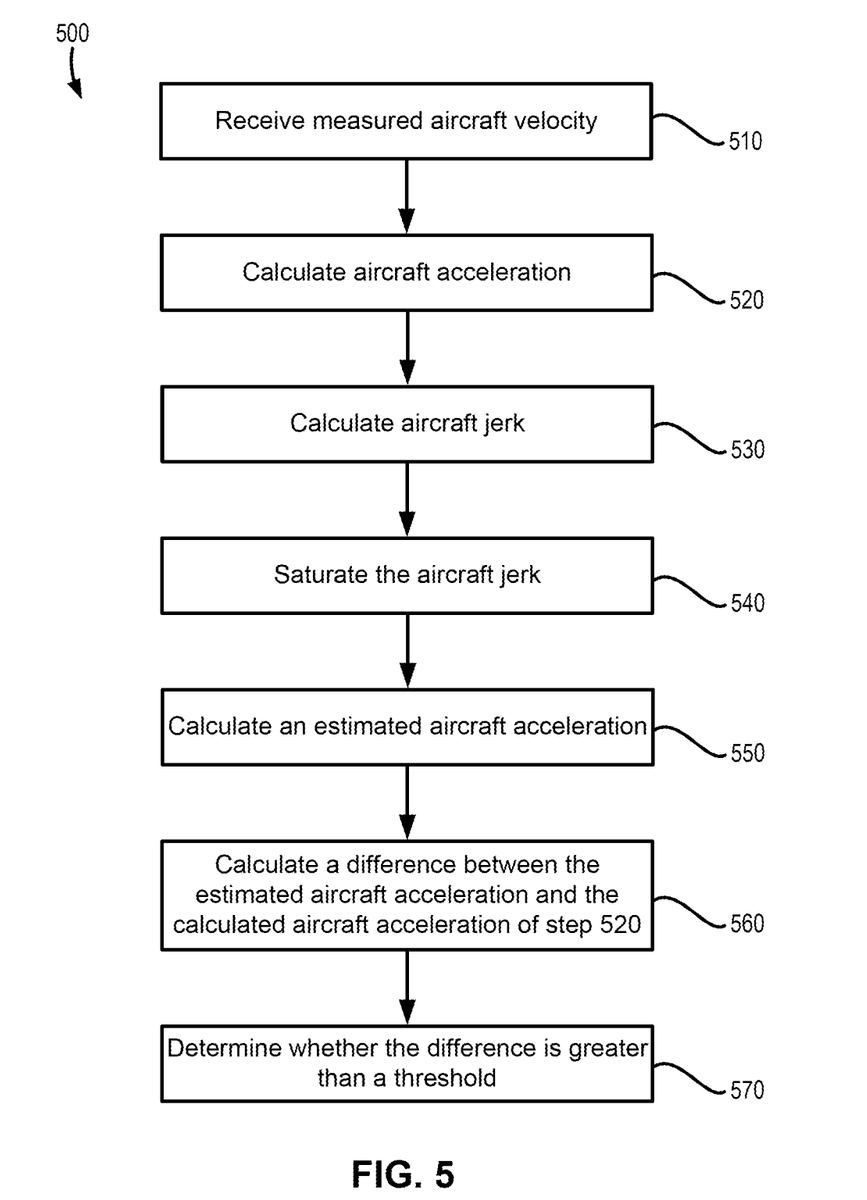
FIG. 5 is a flowchart illustrating a method of controlling a brake system, in accordance with various embodiments.

With reference to FIG. 5, a method 500 for detecting erroneous velocity data is provided, in accordance with various embodiments. Method 500 includes receiving measured aircraft velocity data (step 510). Method 500 includes calculating aircraft acceleration using the measured aircraft velocity data (step 520). Method 500 includes calculating aircraft jerk using the calculated aircraft acceleration (step 530). Method 500 includes calculating a saturated aircraft jerk using the calculated aircraft jerk (step 540). Method 500 includes calculating an estimated aircraft acceleration using the saturated aircraft jerk (step 550). Method 500 includes calculating a difference between the estimated aircraft acceleration and the calculated aircraft acceleration (step 560). Method 500 includes determining whether the difference between the estimated aircraft acceleration and the calculated aircraft acceleration is greater than a predetermined threshold (step 570). Erroneous aircraft velocity data may be determined in response to the difference being greater than the predetermined threshold.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching is used throughout the figures to denote different parts, but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, fixed, connected, or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas, but not necessarily to denote the same or different materials. In some cases, reference coordinates may be specific to each figure.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements, but it may also include other elements not expressly listed or inherent to such process, method, article, or apparatus.

What is claimed is:

1. A system for controlling a braking force applied to a wheel of a vehicle, comprising:
    a brake control unit having an input for receiving a measured vehicle velocity data;
    a velocity sensor operatively coupled to the vehicle for measuring a speed of the vehicle and providing an output signal indicative of the measured vehicle velocity data;
    wherein the brake control unit is configured to detect an error in the measured vehicle velocity data by:
        receiving, at the brake control unit, the measured vehicle velocity data from the velocity sensor;
        calculating, by the brake control unit, an acceleration data using the measured vehicle velocity data;
        calculating, by the brake control unit, a jerk data using the acceleration data;
        calculating, by the brake control unit, a saturated jerk data using the jerk data;
        calculating, by the brake control unit, an estimated acceleration data using the saturated jerk data;
        calculating, by the brake control unit, a difference between the estimated acceleration data and the acceleration data;
        determining, by the brake control unit, whether the difference is greater than a threshold value, wherein the error is detected in response to the difference being greater than the threshold value;
    wherein the brake control unit is further configured to:
        utilize a last known correct velocity data and a filter length for a predetermined duration in response to detecting the error;
        generate an error hold flag for the predetermined duration, wherein the error hold flag indicates that the calculated acceleration data is erroneous; and
        reset an integrator in response to the error hold flag being lowered, wherein the integrator is used to perform the calculating the estimated acceleration data.

2. The system of claim 1, wherein the brake control unit is further configured to filter the measured vehicle velocity data, wherein the calculating the acceleration data is performed using the filtered velocity data.

3. The system of claim 2, wherein the brake control unit is further configured to filter the acceleration data, wherein the calculating the jerk data is performed using the filtered acceleration data.

4. The system of claim 2, wherein the filtering step is performed using a low pass filter.

5. The system of claim 1, further comprising a brake coupled to the wheel of the vehicle, wherein the calculated acceleration data is used by the brake control unit to command the braking force to the wheel with the brake.

6. A brake control unit for controlling braking operation of a wheel of a vehicle based on an output signal provided by a velocity sensor coupled to the vehicle, the brake control unit comprising:
    a first derivative logic configured to calculate a time-series acceleration data using a time-series velocity data received from the velocity sensor;
    a second derivative logic configured to calculate a time-series jerk data using the time-series acceleration data;
    a saturate logic configured to calculate a time-series saturated jerk data using the time-series jerk data;
    an integrator configured to calculate an estimated acceleration data using the time-series saturated jerk data;
    an absolute difference calculator configured to calculate a difference between the estimated acceleration data and the time-series acceleration data;
    an error threshold logic configured to determine whether the difference is greater than a threshold value;
    an error hold counter reset logic configured to output an error hold counter flag for a predetermined duration after it is determined that the difference is greater than the threshold value;
    a falling edge logic configured to detect the error hold counter flag being lowered and further configured to reset the integrator in response thereto;
    wherein the brake control unit is configured to utilize the time-series acceleration data to command a braking force in response to the difference being less than the threshold value; and
    the brake control unit is configured to utilize a last-known correct acceleration data to command the braking force in response to the difference being greater than the threshold value.

7. The brake control unit of claim 6, further comprising a first filter configured to filter the time-series velocity data, wherein the first derivative logic is configured to calculate the time-series acceleration data using the filtered time-series velocity data.

8. The brake control unit of claim 7, further comprising a second filter configured to filter the time-series acceleration data, wherein the second derivative logic is configured to calculate the time-series jerk data using the filtered time-series acceleration data.

9. The brake control unit of claim 6, further comprising an initial condition logic configured to provide the integrator with an initial condition based upon whether the error still persists when an integrator reset command is received.

10. The brake control unit of claim 6, wherein the brake control unit utilizes at least one of the last-known correct acceleration data and the time-series acceleration data to calculate a brake force.

11. A method for detecting an erroneous velocity data using a controller in communication with a velocity sensor onboard a vehicle, comprising:
    receiving, by the controller, a time-series velocity data from the velocity sensor;

calculating, by the controller, a time-series acceleration data using the time-series velocity data;

calculating, by the controller, a time-series jerk data using the time-series acceleration data;

calculating, by the controller, a saturated jerk data using the time-series jerk data;

calculating, by the controller, an estimated acceleration data using the saturated jerk data;

calculating, by the controller, a difference between the estimated acceleration data and the time-series acceleration data;

determining, by the controller, whether the difference is greater than a threshold value;

detecting, by the controller, an error in the time-series velocity data in response to the difference being greater than the threshold value;

generating, by the controller, an error hold flag for the predetermined duration, wherein the error hold flag indicates that the calculated acceleration data is erroneous; and resetting, by the controller, an integrator in response to the error hold flag being lowered, wherein the integrator is used to perform the calculating the estimated acceleration data.

12. The method of claim 11, further comprising filtering the time-series velocity data, wherein the calculating the time-series acceleration data is performed using the filtered time-series velocity data.

13. The method of claim 12, further comprising filtering the time-series acceleration data, wherein the calculating the time-series jerk data is performed using the filtered time-series acceleration data.

14. The method of claim 11, further comprising commanding, by the controller, a braking force using a last known correct velocity data in response to detecting the error.

15. The method of claim 14, further comprising commanding, by the controller, the braking force using the calculated time-series acceleration data in response to the difference being less than the threshold value.

* * * * *